US011313439B2

(12) United States Patent
Mitsuno

(10) Patent No.: US 11,313,439 B2
(45) Date of Patent: Apr. 26, 2022

(54) SPEED REDUCER

(71) Applicant: Nabtesco Corporation, Tokyo (JP)

(72) Inventor: Yuta Mitsuno, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/075,518

(22) Filed: Oct. 20, 2020

(65) Prior Publication Data

US 2021/0123505 A1   Apr. 29, 2021

(30) Foreign Application Priority Data

Oct. 23, 2019 (JP) .............................. JP2019-192963

(51) Int. Cl.
*F16H 1/32* (2006.01)
*F16H 57/023* (2012.01)

(52) U.S. Cl.
CPC ............. *F16H 1/32* (2013.01); *F16H 57/023* (2013.01); *F16H 2001/323* (2013.01)

(58) Field of Classification Search
CPC .... F16H 1/32; F16H 57/023; F16H 2001/323; B25J 9/102
See application file for complete search history.

(56) References Cited

U.S. PATENT DOCUMENTS

| 6,699,152 B2 * | 3/2004 | Tanaka .................. F16H 57/033 |
| | | 475/149 |
| 7,070,533 B2 * | 7/2006 | Tsurumi .................... F16H 1/32 |
| | | 475/162 |
| 7,935,017 B2 * | 5/2011 | Kurita ....................... F16H 1/32 |
| | | 475/162 |
| 8,382,629 B2 * | 2/2013 | Hirata ....................... F16H 1/32 |
| | | 475/162 |

(Continued)

FOREIGN PATENT DOCUMENTS

| CN | 102374237 A | * | 3/2012 | .......... F16C 33/6629 |
| DE | 102015210049 A1 | | 12/2015 | |

(Continued)

OTHER PUBLICATIONS

Extended European Search Report dated Jun. 10, 2021, issued in corresponding European Patent Application No. 20203131.6 (10 pgs.).

*Primary Examiner* — Sherry L Estremsky
(74) *Attorney, Agent, or Firm* — Pillsbury Winthrop Shaw Pittman, LLP

(57) ABSTRACT

A speed reducer includes a case with internal teeth, where the case has a cylindrical shape and an outer diameter D, an inner cylinder centered around an central axis of the case and having an inner diameter R, where R/D falls within a range of 20% to 45%, crank shafts arranged on a circumference of an imaginary circle centered around the central axis of the case, where the crank shafts are spaced away from each (Continued)

other in a circumferential direction of the imaginary circle, and each crank shaft has first external teeth, an external tooth member having second external teeth meshing with the internal teeth, where the external tooth member is eccentrically movable by the crank shafts, and a carrier supporting the crank shafts in a rotatable manner, where the carrier is rotatable by the crank shafts relative to the case.

10 Claims, 1 Drawing Sheet

(56) References Cited

U.S. PATENT DOCUMENTS 8,545,357 B2 * 10/2013 Hibino ............... F16H 1/32
475/178

FOREIGN PATENT DOCUMENTS

| EP | 1767815 A2 * | 3/2007 | ............ F16C 43/06 |
|----|-----|-----|-----|
| EP | 2543909 A1 | 1/2013 | |
| JP | 2007-278355 A | 10/2007 | |
| JP | 2013-160243 A | 8/2013 | |
| KR | 20130045044 A * | 5/2013 | |

* cited by examiner

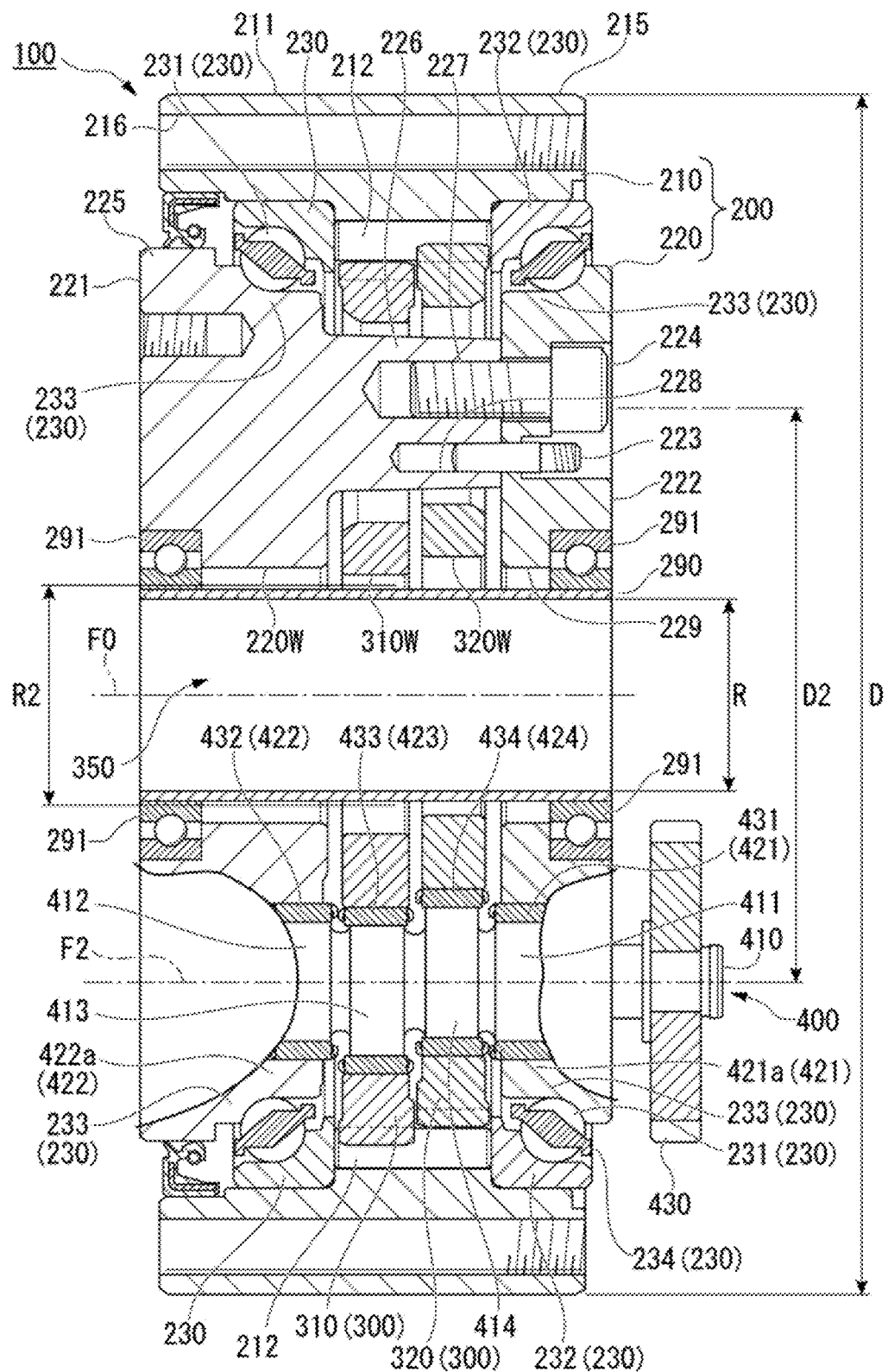

SPEED REDUCER

CROSS-REFERENCE TO RELATED APPLICATIONS

This application is based on and claims the benefit of priority from Japanese Patent Application Serial No. 2019-192963 (filed on Oct. 23, 2019), the contents of which are hereby incorporated by reference in their entirety.

TECHNICAL FIELD

The present invention relates to a speed reducer.

BACKGROUND

Industrial machines (robots) utilize hollow speed reducers disclosed in Japanese Patent Application Publication No. 2013-160243. Such a hollow speed reducer may have a cable and the like penetrating through the hollow space.

In recent years, industrial machines (robots) have an increased number of auxiliary devices connected thereto. This accordingly increases the number of cables penetrating through the hollow space in the hollow speed reducer. For this reason, the hollow diameter of the speed reducer (the diameter of the hollow space within the speed reducer) has been considered to be as important an issue as the performance parameters of the speed reducer. Additionally, in the field of robots, there is a great deal of demand for reducing the size and eliminating the need of teaching, which can be achieved by built-in cables. Such demand, however, contradicts the recent tendency of the increased number of cables and is difficult to be fulfilled. In order to realize these contradicting goals at the same time, it is desired to increase the diameter of the hollow space within the speed reducer.

SUMMARY

The present invention is made in light of the above and attempts to accomplish the objective of an increased diameter of the hollow space while the output from the speed reducer is maintained.

An aspect of the present invention provides a speed reducer including a case with internal teeth, where the case has a cylindrical shape and an outer diameter D, an inner cylinder centered around an central axis of the case and having an inner diameter R, where R/D represents a ratio of the inner diameter R to the outer diameter D of the case and falls within a range of 20% to 45%, a plurality of crank shafts arranged on a circumference of an imaginary circle centered around the central axis of the case, where the crank shafts are spaced away from each other in a circumferential direction of the imaginary circle, and each crank shaft has first external teeth, an external tooth member having second external teeth meshing with the internal teeth of the case, where the external tooth member is eccentrically movable by the crank shafts, and a carrier supporting the crank shafts in a rotatable manner, where the carrier rotatable by the crank shafts relative to the case.

According to the speed reducer relating to one aspect of the present invention, a hollow ratio, which represents the ratio of the hollow diameter to the outer diameter of the case, falls within the above-mentioned range. In this way, a large hollow diameter can be accomplished without increasing the size of the speed reducer while a predetermined reduction ratio and necessary strength are maintained. As a large hollow diameter can be accomplished in this way, it becomes easier to pass a cable through the hollow space.

An aspect of the present invention provides a speed reducer including a case with internal teeth, where the case having a cylindrical shape and an outer diameter D, an inner cylinder centered around a central axis of the case, where the inner cylinder has an inner diameter R, a plurality of crank shafts having a shaft axial line arranged on a circumference of an imaginary circle that is centered around the central axis of the case and that has a diameter D2, where (D−D2)/(D2−R) represents a relation between the outer diameter D of the case, the inner diameter R of the inner cylinder and the diameter D2 and falls within a range of 195% to 320%, the crank shafts are spaced away from each other in a circumferential direction of the imaginary circle, and each crank shaft has first external teeth, an external tooth member having second external teeth meshing with the internal teeth of the case, where the external tooth member is eccentrically movable by the crank shafts, and a carrier supporting the crank shafts in a rotatable manner, where the carrier is rotatable by the crank shafts relative to the case.

According to the speed reducer relating to one aspect of the present invention, a hollow ratio, which represents the ratio of the hollow diameter to the outer diameter of the case, falls within the above-mentioned range while the crank shafts are arranged in the above-described manner relative to the case. In this way, a large hollow diameter can be accomplished without increasing the size of the speed reducer while a predetermined reduction ratio and necessary strength are maintained. As a result, the distance from the outer diameter of the case to the inner diameter of the hollow space can be reduced without increasing the outer diameter of the case while the output from the speed reducer is preserved.

An aspect of the present invention provides a speed reducer including a case with internal teeth, where the case having a cylindrical shape and an outer diameter D, an inner cylinder centered around a central axis of the case, where the inner cylinder has an inner diameter R, a plurality of crank shafts having a shaft axial line arranged on a circumference of an imaginary circle that is centered around the central axis of the case and that has a diameter D2, where (D−D2)/(D−R) represents how the diameter D2 is related to the outer diameter D of the case and the inner diameter R of the inner cylinder and falls within a range of 65% to 76%, the crank shafts are spaced away from each other in a circumferential direction of the imaginary circle, and each crank shaft has first external teeth, an external tooth member having second external teeth meshing with the internal teeth of the case, where the external tooth member is eccentrically movable by the crank shafts, and a carrier supporting the crank shafts in a rotatable manner, where the carrier is rotatable by the crank shafts relative to the case.

According to the speed reducer relating to one aspect of the present invention, a hollow ratio, which represents the ratio of the hollow diameter to the outer diameter of the case, falls within the above-mentioned range while the crank shafts are arranged in the above-described manner relative to the case. In this way, a large hollow diameter can be accomplished without increasing the size of the speed reducer while a predetermined reduction ratio and necessary strength are maintained. As a result, the distance from the outer diameter of the case to the inner diameter of the hollow space can be reduced without increasing the outer diameter of the case while the output from the speed reducer is preserved. In particular, the radial size can be reduced.

According to the speed reducer relating to one aspect of the present invention, R/D representing a ratio of the inner diameter R of the inner cylinder to the outer diameter D of the case may fall within a range of 30% to 45%.

The speed reducer relating to one aspect of the present invention may include a crank journal supporting each of the crank shafts in a rotatable manner relative to the carrier, and an inner cylinder bearing supporting the inner cylinder in the carrier, where the inner cylinder bearing is positioned such that the inner cylinder bearing does not overlap the crank journal in a direction along the central axis of the case.

The speed reducer relating to one aspect of the present invention may include a crank journal supporting each of the crank shafts in a rotatable manner relative to the carrier, and a main bearing supporting the carrier in a rotatable manner relative to the case. The crank journal may have a plurality of cylindrical needles disposed between the crank shafts and the carrier and rollable relative to the carrier, the main bearing may have an inner race, and a portion of the carrier may form the inner race of the main bearing.

The speed reducer relating to one aspect of the present invention may include a crank journal supporting each of the crank shafts in a rotatable manner relative to the carrier, and a main bearing supporting the carrier in a rotatable manner relative to the case. The crank journal may have a plurality of cylindrical needles disposed between the crank shafts and the carrier and rollable relative to the carrier, the crank journal may have an outer race, and a portion of the carrier may form the outer race of the crank journal.

One aspect of the present invention provides a speed reducer including a case with internal teeth, where the case has a cylindrical shape and an outer diameter D, a carrier rotatable relative to the case, where the carrier has a carrier inner wall, and an external tooth member arranged within the carrier and having an external tooth inner wall, where the external tooth member is eccentrically movable. A non-interference region is defined as a region that receives no interference from the carrier inner wall and the external tooth inner wall when the external tooth member eccentrically moves, and an inner diameter R2 of the non-interference region occupies 20% to 45% relative to the outer diameter D.

According to the speed reducer relating to one aspect of the present invention, a hollow ratio, which represents the ratio of the hollow diameter to the outer diameter of the case, falls within the above-mentioned range. In this way, a large hollow diameter can be accomplished without increasing the size of the speed reducer while a predetermined reduction ratio and necessary strength are maintained. As a large hollow diameter can be accomplished in this way, it becomes easier to pass a cable through the hollow space.

One aspect of the present invention provides a speed reducer including a case with internal teeth, where the case has a cylindrical shape and an outer diameter D, a carrier rotatable relative to the case, where the carrier has a carrier inner wall, an external tooth member arranged within the carrier and having an external tooth inner wall, and a crank shaft having a shaft axial line arranged on a circumference of an imaginary circle that is centered around a central axis of the case and that has a diameter D2, where the crank shaft enables the external tooth member to oscillate. Here, R2 denotes an inner diameter of a non-interference region that receives no interference from the carrier inner wall and the external tooth inner wall when the external tooth member eccentrically moves, and a value of (D−D2)/(D2−R2) is within a range of 195% to 320%.

According to the speed reducer relating to one aspect of the present invention, a hollow ratio, which represents the ratio of the hollow diameter to the outer diameter of the case, falls within the above-mentioned range. In this way, a large hollow diameter can be accomplished without increasing the size of the speed reducer while a predetermined reduction ratio and necessary strength are maintained. As a large hollow diameter can be accomplished in this way, it becomes easier to pass a cable through the hollow space.

One aspect of the present invention provides a speed reducer including a case with internal teeth, where the case has a cylindrical shape and an outer diameter D, a carrier rotatable relative to the case, where the carrier has a carrier inner wall, an external tooth member arranged within the carrier and having an external tooth inner wall, and a crank shaft having a shaft axial line arranged on a circumference of an imaginary circle that is centered around a central axis of the case and that has a diameter D2, where the crank shaft enables the external tooth member to oscillate. Here, R2 denotes an inner diameter of a non-interference region that receives no interference from the carrier inner wall and the external tooth inner wall when the external tooth member eccentrically moves, and a value of (D−D2)/(D−R2) is within a range of 65% to 76%.

According to the speed reducer relating to one aspect of the present invention, a hollow ratio, which represents the ratio of the hollow diameter to the outer diameter of the case, falls within the above-mentioned range. In this way, a large hollow diameter can be accomplished without increasing the size of the speed reducer while a predetermined reduction ratio and necessary strength are maintained. As a large hollow diameter can be accomplished in this way, it becomes easier to pass a cable through the hollow space.

Advantageous Effects

The speed reducer relating to one aspect of the present invention can produce the effects of accomplishing an increased diameter of the hollow space while the size of the speed reducer is maintained or reduced.

BRIEF DESCRIPTION OF THE DRAWINGS

FIG. 1 is a cross-sectional view showing a speed reducer relating to an embodiment of the present invention.

DESCRIPTION OF THE PREFERRED EMBODIMENTS

A speed reducer relating to an embodiment of the present invention will be hereinafter described with reference to the drawing. FIG. 1 is a cross-sectional view of a speed reducer according to the present embodiment of the invention. In FIG. 1, a reference number 100 refers to a speed reducer.

A speed reducer 100 relating to an embodiment of the present invention includes a cylindrical housing 200, a gear unit (an external-tooth member) 300 and three crank assemblies 400, as shown in FIG. 1. The cylindrical housing 200 houses therein the gear unit 300 and three crank assemblies 400. In the embodiment, the speed reducer 100 is an eccentric oscillating speed reducer.

The cylindrical housing 200 has an outer cylindrical portion (case) 210, a carrier portion (carrier) 220, two main bearings 230, and an inner cylindrical portion (inner cylinder) 290. The outer cylindrical portion 210 is formed as a cylinder with internal teeth and has an outer diameter D. The carrier portion 220 is disposed inside the outer cylindrical portion 210. The carrier portion 220 supports a plurality of crank shafts 410 (described below) in a rotatable manner and is rotated by the crank shafts 410 relative to the outer cylindrical portion 210.

The two main bearings 230 are each arranged between the outer cylindrical portion 210 and the carrier portion 220. The two main bearings 230 allow the relative rotation of the outer cylindrical portion 210 and the carrier portion 220. In this embodiment, one of the outer cylindrical portion 210 and the carrier portion 220 represents the output unit of the speed reducer 100, for example. The inner cylindrical portion 290 is centered around the central axis of the outer cylindrical portion 210 and has an inner diameter R.

In the speed reducer 100 relating to the present embodiment, each of the crank shafts 410 is provided in one of the crank assemblies 400. The crank shafts 410 are arranged on the circumference of the imaginary circle, which is centered around the central axis F0 of the outer cylindrical portion 210 (the arrangement circle on which the crank shafts 410 can be arranged), and spaced away from each other in the circumferential direction of the imaginary circle. The crank shafts 410 each have first external teeth. Here, the imaginary circle denotes a circle having a diameter identified by the reference numeral D2 in FIG. 1. More specifically, a crank shaft axial line F2 (shaft axial line) of each crank shaft 410 is positioned on the circumference of the imaginary circle having the diameter D2. The crank shafts 410 are configured to oscillate the gear unit 300.

The gear unit 300 is arranged within the carrier portion 220 and has second external teeth, which mesh with the internal teeth of the outer cylindrical portion 210. The second external teeth of the gear unit 300 are different from the first external teeth of the crank shafts 410. The gear unit 300 is oscillated by the crank shafts 410 and eccentrically moved by the rotation of the crank shafts 410.

FIG. 1 shows the central axis (main axis) F0 of the speed reducer 100, which is defined as the axis of rotation for the two main bearings 230. When the outer cylindrical portion 210 is stationary, the carrier portion 220 rotates about the main axis F0. When the carrier portion 220 is stationary, the outer cylindrical portion 210 rotates about the main axis F0. In other words, one of the outer cylindrical portion 210 and the carrier portion 220 can rotate relative to the other around the main axis F0.

An attaching portion 215 surrounds the outer periphery of the outer cylindrical portion 210, which has a cylindrical shape. The attaching portion 215 has a plurality of attaching holes 216 formed in the periphery thereof and the attaching holes 216 are spaced away from each other. The attaching portion 215 is used to mount the speed reducer 100 as an inlay, for example.

The outer cylindrical portion 210 includes an outer cylinder 211 and a plurality of internal tooth pins (internal teeth) 212. The outer cylinder 211 forms a cylindrical internal space in which the carrier portion 220, gear unit 300 and crank assemblies 400 are housed. The internal tooth pins 212 are columnar members extending substantially parallel to the main axis F0. The internal tooth pins 212 are fitted in grooves formed in the inner wall of the outer cylinder 211. Therefore, the internal tooth pins 212 are appropriately retained by the outer cylinder 211.

The plurality of internal tooth pins 212 are arranged at substantially regular intervals around the main axis F0. Each internal tooth pin 212 has a semiperimeter surface projecting from the inner wall of the outer cylinder 211 toward the main axis F0. Therefore, the plurality of internal tooth pins 212 serve as internal teeth meshing with the gear unit 300.

The carrier portion 220 includes a base portion 221, an end plate portion 222, a positioning pin 223 and a fixing bolt 224. The carrier portion 220 as a whole has a cylindrical shape. The carrier portion 220 has a through hole 229 formed therein, which is centered around the main axis F0. The carrier portion 220 has an inner wall of the through hole 229, in other words, a carrier inner wall 220W.

In the through hole 229, the inner cylindrical portion 290 is rotatably supported by an inner cylinder bearing 291 with respect to the carrier portion 220. Although FIG. 1 shows that the inner cylinder bearing 291 is positioned inside the through hole 229 in the radial direction, the present embodiment is not limited to such as long as the inner cylindrical portion 290 is capable of rotating relative to the carrier portion 220 and the gear unit 300.

The base portion 221 includes a base plate portion 225 and three shaft portions 226. Each of the three shaft portions 226 extends from the base plate portion 225 toward the end plate portion 222. The end surface of each of the three shaft portions 226, which faces away from the base plate portion 225, has a screw hole 227 and a reaming hole 228 formed therein. The positioning pin 223 is inserted into the reaming hole 228. This in turn accurately positions the end plate portion 222 relative to the base portion 221. The fixing bolt 224 is screwed into the screw hole 227. This in turn appropriately secures the end plate portion 222 to the base portion 221.

The gear unit 300 is disposed between the base plate portion 225 and the end plate portion 222. The three shaft portions 226 extend through the gear unit 300 and are connected to the end plate portion 222.

The gear unit 300 includes two gears 310 and 320. The gear 310 is disposed between the base plate portion 225 and the gear 320. The gear 320 is disposed between the end plate portion 222 and the gear 310. The gear 310 has a gear inner wall 310W (external tooth inner wall). The gear 320 has a gear inner wall 320W (external tooth inner wall).

The gear 310 is substantially equal in shape and size to the gear 320. The gears 310 and 320 performs revolution movement within the outer cylinder 211 while being meshed with the internal tooth pins 212. Accordingly, the respective centers of the gears 310 and 320 revolve about the main axis F0.

The phase of the revolution performed by the gear 310 is off by substantially 180° the phase of the revolution performed by the gear 320. While the gear 310 meshes with half of the internal tooth pins 212 of the outer cylindrical portion 210, the gear 320 meshes with the remaining half of the internal tooth pins 212. In this way, the gear unit 300 can rotate one of the outer cylindrical portion 210 and the carrier portion 220.

In the present embodiment, the gear unit 300 includes the two gears 310 and 320. Alternatively, the gear unit 300 may include more than two gears. As another alternative example, the gear unit 300 may use a single gear.

Each of the three crank assemblies 400 includes a crank shaft 410, four bearings 421, 422, 423 and 424 and a transmission gear (external teeth) 430. It may also be possible that the transmission gear 430 is formed of a spur gear in general use. In the speed reducer 100 relating to the present embodiment, the transmission gear 430 is not limited to any particular type.

The transmission gear 430 directly or indirectly receives the driving force generated by a driving source (for example, a motor). The speed reducer 100 can designate an appropriate one of transmission paths for the driving force transmitting from the driving source to the transmission gear 430, depending on the environment where and conditions under which the speed reducer 100 is used. Accordingly, the present embodiment is not limited to any particular transmission path regarding the driving force transmitting from the driving source to the transmission gear 430.

FIG. 1 shows a crank shaft axial line (transmission axis) F2. The transmission axis F2 is substantially parallel to the main axis F0. There are a plurality of transmission axes F2, which are spaced away from each other in the circumferential direction on the circumference of the circle that is centered on the central axis F0 and has a diameter D2. The crank shaft 410 rotates about the transmission axis F2. FIG. 1 does not include a cross-sectional view of the vicinity of the respective ends of the crank shaft 410.

The crank shaft 410 includes two journals (crank journals) 411, 412 and two eccentric portions (eccentric members) 413, 414. The journals 411, 412 extend along the transmission axis F2. The journals 411, 412 rotatably support the crank shaft 410 with respect to the carrier portion 220. The central axis of the journals 411, 412 coincides with the transmission axis F2. The eccentric portions 413, 414 are formed between the journals 411 and 412. Each of the eccentric portions 413 and 414 is eccentrically arranged with respect to the transmission axis F2. The crank shaft 410 has a quadruple-needle needle bearing configuration, which includes the two journals 411, 412 and two eccentric portions (eccentric members) 413, 414.

The journal 411 is inserted into the bearing 421. The bearing 421 is arranged between the journal 411 and the end plate portion 222. Accordingly, the journal 411 is retained by the end plate portion 222 and the bearing 421. The journal 412 is inserted into the bearing 422. The bearing 422 is arranged between the journal 412 and the base portion 221. Accordingly, the journal 412 is retained by the base portion 221 and the bearing 422.

In the present embodiment, the bearing 421 is a needle bearing such that a plurality of cylindrical needles 431 are arranged around the journal 411. The bearing 422 is a needle bearing such that a plurality of cylindrical needles 432 are arranged around the journal 412.

In other words, the bearings 421, 422 form part of the crank journal relating to the present invention. Each of the bearings 421, 422 has an outer race, and a portion of the carrier portion 220 form the outer race of the bearings 421, 422 (crank journal). Furthermore, in other words, the needles 431, 432 form part of the crank journal relating to the present invention and are arranged between the crank shafts 410 and the carrier portion 220. The needles 431, 432 roll relative to the carrier portion 220.

The eccentric portion 413 is inserted into the bearing 423. The bearing 423 is disposed between the eccentric portion 413 and the gear 310. The eccentric portion 414 is inserted into the bearing 424. The bearing 424 is disposed between the eccentric portion 414 and the gear 320. The eccentric portions 413, 414 eccentrically move about the transmission axis F2. In the present embodiment, the bearing 423 is a needle bearing such that a plurality of needles 433 are arranged around the eccentric portion (eccentric member) 413. The bearing 424 is a needle bearing such that a plurality of needles 434 are arranged around the eccentric portion (eccentric member) 414. The needles 431, 432, 433, 434 are arranged such that their respective axes are parallel to each other. The needles 431, 432, 433, 434 are arranged such that their respective axes are parallel to the main axis F0.

As driving force is input into the transmission gear 430, the crank shafts 410 rotate about the transmission axis F2. This in turn causes the eccentric portions 413, 414 to eccentrically rotate about the transmission axis F2. The gears 310, 320, which are connected to the eccentric portions 413, 414 via the bearings 423, 424, resultantly oscillate within the circular space defined by the outer cylindrical portion 210. As the gears 310, 320 mesh with the internal tooth pins 212, relative rotation between the outer cylindrical portion 210 and the carrier portion 220 is caused.

The bearings 421, 424, 423, 422 are arranged next to each other in the direction extending along the transmission axis F2 and the main axis F0. The inner cylinder bearing 291 is positioned such that it does not overlap the bearings 421, 424, 423, 422 in the direction extending along the transmission axis F2 and the main axis F0. The inner cylinder bearing 291 retains the inner cylindrical portion 290 in the carrier portion 220 at a position where the inner cylinder bearing 291 does not overlap the journals 411, 412 in the direction extending along the central axis F0 of the outer cylindrical portion 210. In this way, even if the crank shaft 410 and the inner cylinder bearing 291 are close to each other in the radial direction with respect to the main axis F0, the inner cylinder bearing 291 does not interfere with the bearings 421, 424, 423, 422. This allows for a small distance in the radial direction with respect to the main axis F0 between the inner cylinder bearing 291 and the bearings 421, 424, 423, 422.

The bearings 421, 424, 423, 422 are each a needle bearing. On the other hand, the main bearings 230 have an angular contact ball bearing configuration.

The main bearings 230 are arranged between the outer cylindrical portion 210 and the outer periphery of the carrier portion 220. There are two main bearings 230, which are spaced away from each other in the main axis F0 direction. The two main bearings 230 sandwich the internal tooth pins 212 of the outer cylindrical portion 210 in the main axis F0 direction. The main bearings 230 allow the relative rotation of the outer cylindrical portion 210 and the carrier portion 220.

The main bearings 230 each include a spherical rolling element (ball) 231, an outer race 232 serving as an outer ring, an inner race 233 serving as an inner ring, and a retainer 234 for retaining the rolling element (ball) 231 between the outer lace 232 and the inner race 233. A portion of the carrier portion 220 form the inner race of the main bearings 230. The main bearings 230 are configured such that their lines of action approach the main axis F0 in the direction along the main axis F0 away from the internal tooth pins 212. In other words, the lines of action of the two main bearings 230 are configured to intersect with each other in the direction extending along the main axis F0.

The inner races 233 are integrally formed with the carrier portion 220. To be more specific, one of the main bearings 230 which is closer to the bearing 422 in the main axis F0 direction has an inner race 233 integrally formed with the base portion 221. The other of the main bearings 230 which is closer to the bearing 421 in the main axis F0 direction, has an inner race 233 integrally formed with the end plate portion 222.

The bearing 421 is integrally formed with the carrier portion 220. To be more specific, the bearing 421 has an outer race 421a, which abuts the needles 431 and is integrally formed with the end plate portion 222. The bearing 422 is integrally formed with the carrier portion 220. To be more specific, the bearing 422 has an outer race 422a, which abuts the needles 432 and is integrally formed with the base portion 221.

The parts of the speed reducer 100 relating to the present embodiment are defined as follows in terms of their dimensions and the relations between the same.

D: the outer diameter of the outer cylindrical portion 210

R: the inner diameter (diameter) of the inner cylindrical portion 290

D2: the diameter of the imaginary circle that is centered around the main axis F0 and on which the crank shaft axial lines F2 are arranged R2: the inner diameter of a non-interference region 350 that receives no interference from the carrier inner wall 220W and the gear inner walls 310W, 320W when the gear unit 300 eccentrically moves The value of R/D, which represents the ratio of the inner diameter R of the inner cylindrical portion 290 to the outer diameter D of the outer cylindrical portion 210, is preferably within the range of 20% to 45%. Furthermore, the value of R/D is more preferably within the range of 30.3% to 45%. Furthermore, the value of R/D is even more preferably within the range of 40% to 43%.

The speed reducer 100 relating to the present embodiment has a hollow ratio, which represents the ratio of the inner diameter R of the inner cylindrical portion 290 to the outer diameter D of the outer cylindrical portion 210, within the above-mentioned range. In this way, a large hollow diameter (inner diameter) R can be accomplished without increasing the size of the speed reducer 100 while a predetermined reduction ratio and necessary strength are maintained. As the inner cylindrical portion 290 can accomplish a large radial dimension in this way, it becomes easier to pass a cable through the internal space of the inner cylindrical portion 290.

The value of (D−D2)/(D2−R), which represents the relation between the outer diameter D of the outer cylindrical portion 210, the inner diameter R of the inner cylindrical portion 290 and the diameter D2 of the imaginary circle that is centered around the main axis F0 and on which the crank shaft axial lines F2 are arranged, is preferably within the range of 195% to 320%. Furthermore, the value of (D−D2)/(D2−R) is more preferably within the range of 195% to 250%. Furthermore, the value of (D−D2)/(D2−R) is even more preferably within the range of 196% to 198%.

According to the speed reducer 100 relating to the present embodiment, the diameter D2 of the imaginary circle (arrangement circle) on which the crank shafts 410 are arranged is defined relative to the outer diameter D of the outer cylindrical portion 210. Additionally, the hollow ratio, which represents the ratio of the inner diameter R of the inner cylindrical portion 290 to the outer diameter D of the outer cylindrical portion 210, falls within the above-mentioned range. In this way, the inner cylindrical portion 290 can accomplish a large inner diameter R without increasing the size of the speed reducer 100 while a predetermined reduction ratio and necessary strength are maintained. As a result, the distance from the outer diameter D of the outer cylindrical portion 210 to the inner diameter R of the inner cylindrical portion 290 can be reduced without increasing the outer diameter D of the outer cylindrical portion 210 while the output from the speed reducer 100 is preserved.

The value of (D−D2)/(D−R), which represents the relation between the outer diameter D of the outer cylindrical portion 210, the inner diameter R of the inner cylindrical portion 290 and the diameter D2 of the imaginary circle that is centered around the main axis F0 and on which the crank shaft axial lines F2 are arranged, is preferably within the range of 65% to 76%. Furthermore, the value of (D−D2)/(D−R) is more preferably within the range of 65% to 71%. Furthermore, the value of (D−D2)/(D−R) is even more preferably within the range of 66% to 68%.

According to the speed reducer 100 relating to the present embodiment, the diameter D2 of the imaginary circle (arrangement circle) on which the crank shafts 410 are arranged is defined relative to the outer diameter D of the outer cylindrical portion 210. Additionally, the hollow ratio, which represents the ratio of the inner diameter R of the inner cylindrical portion 290 to the outer diameter D of the outer cylindrical portion 210, falls within the above-mentioned range. In this way, the inner cylindrical portion 290 can accomplish a large inner diameter R without increasing the size of the speed reducer 100 while a predetermined reduction ratio and necessary strength are maintained. As a result, the distance from the outer diameter D of the outer cylindrical portion 210 to the inner diameter R of the inner cylindrical portion 290 can be reduced without increasing the outer diameter D of the outer cylindrical portion 210 while the output from the speed reducer 100 is preserved. In particular, the radial size of the speed reducer 100 can be reduced.

The value of R2/D, which represents the ratio of the inner diameter R2 of the non-interference region 350 to the outer diameter D of the outer cylindrical portion 210, is preferably within the range of 20% to 45%. Furthermore, the value of R2/D is more preferably within the range of 30.3% to 45%. Furthermore, the value of R2/D is even more preferably within the range of 40% to 43%. Here, the inner diameter R2 of the non-interference region 350 is defined as the result of adding the movable range of the gear unit 300 to the inner diameter of the through hole 229 and is a radial dimension slightly larger than the outer diameter of the inner cylindrical portion 290. In other words, the inner diameter R2 of the non-interference region 350 is the inner diameter of the portion (non-interference region 350) that receives no interference from the carrier inner wall 220W and the gear inner walls 310W, 320W when the gear unit 300 eccentrically moves. The inner diameter R2 is substantially equal to the outer diameter of the inner cylindrical portion 290. In other words, the non-interference region 350 denotes the region into which the carrier inner wall 220W and the gear inner walls 310W, 320W do not project (invade) when the gear unit 300 eccentrically moves.

The speed reducer 100 relating to the present embodiment has the hollow ratio, which represents the ratio of the inner diameter R2 to the outer diameter D of the outer cylindrical portion 210, within the above-mentioned range. In this way, a large hollow diameter (inner diameter) R can be accomplished without increasing the size of the speed reducer 100 while a predetermined reduction ratio and necessary strength are maintained. As the inner cylindrical portion 290 can accomplish a large radial dimension in this way, it becomes easier to pass a cable through the internal space of the inner cylindrical portion 290.

The value of (D−D2)/(D2−R2), which represents the relation between the outer diameter D of the outer cylindrical portion 210 and the inner diameter R2 of the non-interference region 350, namely, the relation between the outer diameter D of the outer cylindrical portion 210, the outer diameter R2 of the inner cylindrical portion 290 and the diameter D2 of the imaginary circle, is preferably within the range of 195% to 320%. Furthermore, the value of (D−D2)/(D2−R2) is more preferably within the range of 195% to 250%. Furthermore, the value of (D−D2)/(D2−R2) is even more preferably within the range of 196% to 198%. Here, the inner diameter R2 of the non-interference region 350 is defined as the result of adding the movable range of the gear unit 300 to the inner diameter of the through hole 229 and is a radial dimension slightly larger than the outer diameter of the inner cylindrical portion 290. In other words, the inner diameter R2 of the non-interference region 350 is the inner diameter of the portion (non-interference region 350) that receives no interference from the carrier inner wall 220W and the gear inner walls 310W, 320W when the gear unit 300 eccentrically moves.

According to the speed reducer 100 relating to the present embodiment, the diameter D2 of the imaginary circle (arrangement circle) on which the crank shafts 410 are arranged is defined relative to the outer diameter D of the outer cylindrical portion 210. Additionally, the inner diameter R2 of the non-interference region 350, which is substantially equal to the outer diameter of the inner cylindrical portion 290, achieves a hollow ratio within the above-mentioned range. In this way, the inner cylindrical portion 290 can accomplish a large inner diameter R without increasing the size of the speed reducer 100 while a predetermined reduction ratio and necessary strength are maintained. As a result, the distance from the outer diameter D of the outer cylindrical portion 210 to the inner diameter R of the inner cylindrical portion 290 can be reduced without increasing the outer diameter D of the outer cylindrical portion 210 while the output from the speed reducer 100 is preserved.

The value of (D−D2)/(D−R2), which represents the relation between the outer diameter D of the outer cylindrical portion 210 and the inner diameter R2 of the non-interference region 350, namely, the relation between the outer diameter D of the outer cylindrical portion 210, the inner diameter R2 of the non-interference region 350, which is substantially equal to the outer diameter of the inner cylindrical portion 290, and the diameter D2 of the imaginary circle, is preferably within the range of 65% to 76%. Furthermore, the value of (D−D2)/(D−R2) is more preferably within the range of 65% to 71%. Furthermore, the value of (D−D2)/(D−R2) is even more preferably within the range of 66% to 68%. Here, the inner diameter R2 of the non-interference region 350 is defined as the result of adding the movable range of the gear unit 300 to the inner diameter of the through hole 229 and is a radial dimension slightly larger than the outer diameter of the inner cylindrical portion 290. In other words, the inner diameter R2 of the non-interference region 350 is the inner diameter of the portion (non-interference region 350) that receives no interference from the carrier inner wall 220W and the gear inner walls 310W, 320W when the gear unit 300 eccentrically moves.

According to the speed reducer 100 relating to the present embodiment, the diameter D2 of the imaginary circle (arrangement circle) on which the crank shafts 410 are arranged is defined relative to the outer diameter D of the outer cylindrical portion 210. Additionally, the hollow ratio represents the ratio of the inner diameter R2 of the non-interference region 350, which is substantially equal to the outer diameter of the inner cylindrical portion 290, to the outer diameter D of the outer cylindrical portion 210 and falls within the above-mentioned range. In this way, the inner cylindrical portion 290 can accomplish a large inner diameter R without increasing the size of the speed reducer 100 while a predetermined reduction ratio and necessary strength are maintained. As a result, the distance from the outer diameter D of the outer cylindrical portion 210 to the inner diameter R of the inner cylindrical portion 290 can be reduced without increasing the outer diameter D of the outer cylindrical portion 210 while the output from the speed reducer 100 is preserved. In particular, the radial size of the speed reducer 100 can be reduced.

In the speed reducer 100 relating to the present embodiment, the journals 411, 412 and eccentric portions (eccentric members) 413, 414 of the crank shaft 410 form a cylindrical needle bearing, and the inner cylinder bearing 291 is positioned such that it does not overlap these in the direction along the axis of rotation. In other words, since the journals 411, 412 and eccentric portions (eccentric members) 413, 414 are not aligned with the inner cylinder bearing 291 in the axial direction, the distance from the crank shaft axial line (shaft axial line) F2 of the crank shaft 410 to the inner periphery of the crank, or the distance from the crank shaft axial line (shaft axial line) F2 of the crank shaft 410 to the inner cylindrical portion 290 can be reduced.

In the speed reducer 100 relating to the present embodiment, the bearings 421, 422, 423 and 424 of the crank shaft 410 are cylindrical needle bearings, and the member rollable by the cylindrical needles 431, 432, 433 and 434 is integrally formed with the carrier portion (hold) 220. The bearing 421 has the outer race 421a, which abuts the needles 431 and is integrally formed with the end plate portion 222. The bearing 422 has an outer race 422a, which abuts the needle 432 and is integrally formed with the base portion 221. The inner race 233 of the main bearings 230, which are angular bearings, is integrally formed with the carrier portion 220.

With the above-described features, it is possible to accomplish a reduced size for the region surrounding the crank shaft 410. The hollow ratio, which represents the ratio of the diameter D2 of the imaginary circle (arrangement circle) on which the crank shafts 410 are arranged to the outer diameter D of the outer cylindrical portion 210 and, at the same time, the ratio of the inner diameter R of the inner cylindrical portion 290 to the outer diameter D of the outer cylindrical portion 210, can fall within the above-mentioned range. In other words, the outer race of the cylindrical needles also serves as the inner race of the angular bearings.

The present embodiment can provide a speed reducer having a small outer diameter and a large hollow diameter, which have never been achieved in the conventional art, and additionally having an accurate reduction ratio and high rigidity.

What is claimed is:
1. A speed reducer comprising:
a case with internal teeth, the case having a cylindrical shape and an outer diameter D;
an inner cylinder centered around a central axis of the case, the inner cylinder having an inner diameter R;
a plurality of crank shafts having a shaft axial line arranged on a circumference of an imaginary circle that is centered around the central axis of the case and that has a diameter D2, (D−D2)/(D2−R) representing a relation between the outer diameter D of the case, the inner diameter R of the inner cylinder and the diameter D2 and falling within a range of 195% to 320%, the crank shafts being spaced away from each other in a circumferential direction of the imaginary circle, each crank shaft having first external teeth;
an external tooth member having second external teeth meshing with the internal teeth of the case, the external tooth member being eccentrically movable by the crank shafts; and
a carrier supporting the crank shafts in a rotatable manner, the carrier being rotatable by the crank shafts relative to the case.

2. The speed reducer of claim 1, wherein R/D representing a ratio of the inner diameter R of the inner cylinder to the outer diameter D of the case falls within a range of 30% to 45%.

3. The speed reducer of claim 1, comprising:
a crank journal supporting each of the crank shafts in a rotatable manner relative to the carrier; and
an inner cylinder bearing supporting the inner cylinder in the carrier, the inner cylinder bearing being positioned such that the inner cylinder bearing does not overlap the crank journal in a direction along the central axis of the case.

4. The speed reducer of claim 1, comprising:
a crank journal supporting each of the crank shafts in a rotatable manner relative to the carrier; and
a main bearing supporting the carrier in a rotatable manner relative to the case,
wherein the crank journal has a plurality of cylindrical needles disposed between the crank shafts and the carrier and rollable relative to the carrier,
wherein the main bearing has an inner race, and
wherein a portion of the carrier forms the inner race of the main bearing.

5. The speed reducer of claim 1, comprising:
a crank journal supporting each of the crank shafts in a rotatable manner relative to the carrier; and
a main bearing supporting the carrier in a rotatable manner relative to the case,
wherein the crank journal has a plurality of cylindrical needles disposed between the crank shafts and the carrier and rollable relative to the carrier,
wherein the crank journal has an outer race, and
wherein a portion of the carrier forms the outer race of the crank journal.

6. A speed reducer comprising:
a case with internal teeth, the case having a cylindrical shape and an outer diameter D;
an inner cylinder centered around a central axis of the case, the inner cylinder having an inner diameter R;
a plurality of crank shafts having a shaft axial line arranged on a circumference of an imaginary circle that is centered around the central axis of the case and that has a diameter D2, (D−D2)/(D−R) representing how the diameter D2 is related to the outer diameter D of the case and the inner diameter R of the inner cylinder and falling within a range of 65% to 76%, the crank shafts being spaced away from each other in a circumferential direction of the imaginary circle, each crank shaft having first external teeth;
an external tooth member having second external teeth meshing with the internal teeth of the case, the external tooth member being eccentrically movable by the crank shafts; and
a carrier supporting the crank shafts in a rotatable manner, the carrier being rotatable by the crank shafts relative to the case.

7. The speed reducer of claim 6, wherein R/D representing a ratio of the inner diameter R of the inner cylinder to the outer diameter D of the case falls within a range of 30% to 45%.

8. The speed reducer of claim 6, comprising:
a crank journal supporting each of the crank shafts in a rotatable manner relative to the carrier; and
an inner cylinder bearing supporting the inner cylinder in the carrier, the inner cylinder bearing being positioned such that the inner cylinder bearing does not overlap the crank journal in a direction along the central axis of the case.

9. The speed reducer of claim 6, comprising:
a crank journal supporting each of the crank shafts in a rotatable manner relative to the carrier; and
a main bearing supporting the carrier in a rotatable manner relative to the case,
wherein the crank journal has a plurality of cylindrical needles disposed between the crank shafts and the carrier and rollable relative to the carrier,
wherein the main bearing has an inner race, and
wherein a portion of the carrier forms the inner race of the main bearing.

10. The speed reducer of claim 6, comprising:
a crank journal supporting each of the crank shafts in a rotatable manner relative to the carrier; and
a main bearing supporting the carrier in a rotatable manner relative to the case,
wherein the crank journal has a plurality of cylindrical needles disposed between the crank shafts and the carrier and rollable relative to the carrier,
wherein the crank journal has an outer race, and
wherein a portion of the carrier forms the outer race of the crank journal.

* * * * *